United States Patent
Li et al.

(10) Patent No.: US 8,929,114 B2
(45) Date of Patent: Jan. 6, 2015

(54) THREE-LEVEL ACTIVE NEUTRAL POINT CLAMPED ZERO VOLTAGE SWITCHING CONVERTER

(75) Inventors: Jin Li, Shanghai (CN); Dushan Boroyevich, Blacksburg, VA (US); Jinjun Liu, Xi'an (CN)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 422 days.

(21) Appl. No.: 13/403,010

(22) Filed: Feb. 23, 2012

(65) Prior Publication Data

US 2012/0218785 A1 Aug. 30, 2012

Related U.S. Application Data

(60) Provisional application No. 61/446,263, filed on Feb. 24, 2011.

(51) Int. Cl.
| | |
|---|---|
| *H02M 3/24* | (2006.01) |
| *H02M 7/155* | (2006.01) |
| *H02M 7/5387* | (2007.01) |
| *H02M 7/487* | (2007.01) |
| *H02M 1/34* | (2007.01) |
| *H02M 1/00* | (2006.01) |

(52) U.S. Cl.
CPC ............... *H02M 7/487* (2013.01); *H02M 1/34* (2013.01); *H02M 2001/0058* (2013.01); *H02M 2001/342* (2013.01); *Y02B 70/1491* (2013.01)
USPC ............................. 363/132; 363/98; 363/130

(58) Field of Classification Search
CPC . H02M 1/34; H02M 7/487; H02M 2001/342; H02M 2001/0085
USPC ......... 363/21.12, 37, 56.01–56.02, 56.12, 58, 363/61, 84, 89, 95–98, 125–127, 131–132
See application file for complete search history.

(56) References Cited

U.S. PATENT DOCUMENTS

| | | | | |
|---|---|---|---|---|
| 5,459,655 | A * | 10/1995 | Mori et al. | 363/132 |
| 5,638,266 | A * | 6/1997 | Horie et al. | 363/132 |
| 5,731,970 | A * | 3/1998 | Mori et al. | 363/132 |
| 6,028,779 | A * | 2/2000 | Sakamoto et al. | 363/55 |
| 6,072,707 | A * | 6/2000 | Hochgraf | 363/71 |
| 6,075,715 | A * | 6/2000 | Maehara et al. | 363/37 |
| 6,349,044 | B1 * | 2/2002 | Canales-Abarca et al. | 363/17 |
| 6,392,907 | B1 * | 5/2002 | Ichikawa | 363/98 |
| 6,483,724 | B1 * | 11/2002 | Blair et al. | 363/17 |
| 6,697,274 | B2 * | 2/2004 | Bernet et al. | 363/132 |

(Continued)

*Primary Examiner* — Timothy J Dole
*Assistant Examiner* — Yusef Ahmed
(74) *Attorney, Agent, or Firm* — Whitham, Curtis, Chistofferson & Cook, P.C.

(57) ABSTRACT

A main circuit of a three-level active neutral point clamped voltage source converter having a pair of additional main switches provides two paths between an output node and a neutral point in which one of the paths involves only switches of an inner pair of switches that are operated at a high frequency. An auxiliary circuit operating at a high frequency for only a brief period during each high frequency switching cycle selects the path involving only the inner switches and provides operation with zero voltage switching and avoids reverse recovery of diodes connected antiparallel with the main and additional main switches. Accordingly, turn-on switching losses in the main switches is avoided and the voltage source converter can be operated at increased frequency to allow reduction in size of magnetic components and full potential power transfer to be achieved.

10 Claims, 14 Drawing Sheets

(56) References Cited

U.S. PATENT DOCUMENTS

| | | | | |
|---|---|---|---|---|
| 6,838,925 B1* | 1/2005 | Nielsen | | 327/391 |
| 7,508,640 B2* | 3/2009 | Knapp et al. | | 361/93.1 |
| 8,169,797 B2* | 5/2012 | Coccia et al. | | 363/21.03 |
| 2005/0105314 A1* | 5/2005 | Nielsen | | 363/132 |
| 2006/0221653 A1* | 10/2006 | Lai et al. | | 363/37 |
| 2009/0201706 A1* | 8/2009 | Zacharias et al. | | 363/123 |
| 2009/0207639 A1* | 8/2009 | Tanaka et al. | | 363/141 |
| 2010/0156354 A1* | 6/2010 | Nielsen | | 320/137 |
| 2011/0013438 A1* | 1/2011 | Frisch et al. | | 363/131 |
| 2011/0019453 A1* | 1/2011 | Gonzalez Senosiain et al. | | 363/131 |
| 2011/0110136 A1* | 5/2011 | Lacarnoy | | 363/127 |
| 2012/0120698 A1* | 5/2012 | Viitanen | | 363/126 |
| 2012/0187879 A1* | 7/2012 | Galea et al. | | 318/400.29 |
| 2012/0257430 A1* | 10/2012 | Truettner | | 363/131 |
| 2013/0155747 A1* | 6/2013 | Wang | | 363/132 |
| 2013/0272045 A1* | 10/2013 | Soeiro et al. | | 363/131 |

* cited by examiner

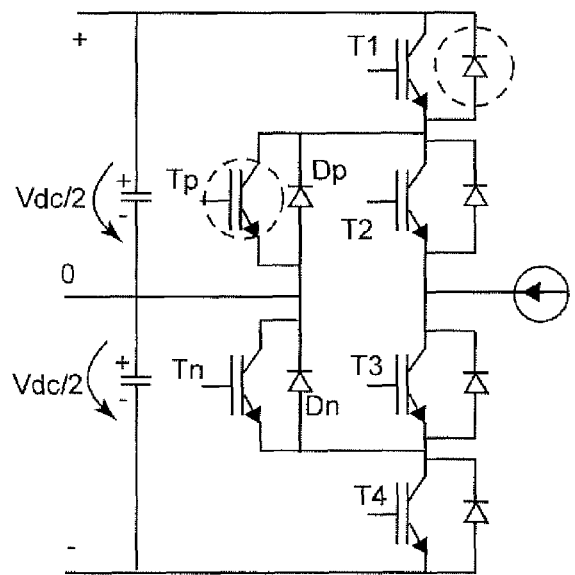
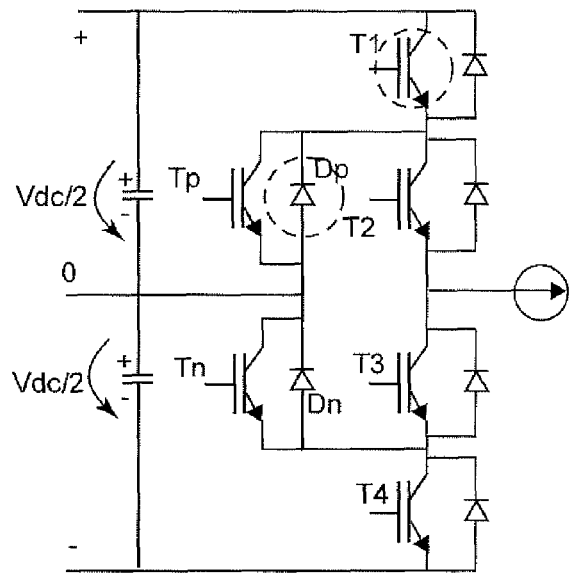
Figure 4A  Figure 4B
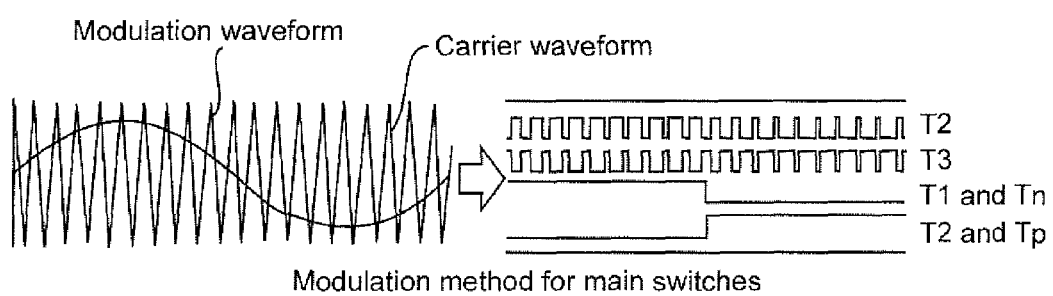
Modulation method for main switches
Figure 9

THREE-LEVEL ACTIVE NEUTRAL POINT CLAMPED ZERO VOLTAGE SWITCHING CONVERTER

CROSS-REFERENCE TO RELATED APPLICATIONS

This application claims benefit of priority of U.S. Provisional Application 61/446,263, filed Feb. 24, 2011, which is hereby incorporated by reference in its entirety.

FIELD OF THE INVENTION

The present invention generally relates to power converter circuits and, more particularly, to bi-directional power converters capable of converting DC to AC or AC to DC power.

BACKGROUND OF THE INVENTION

Electrical power is required for operation of a wide variety of devices that provide convenience or answer necessities in many aspects of modern life and human activities. At the present time, electrical power is distributed from locations where it can be conveniently generated to locations where it is utilized as alternating current or voltage (AC) even though many devices, particularly those involving electronic circuits utilize power at a substantially constant voltage referred to as direct current (DC) due to the ability to transmit power at high voltage and relatively low current for substantial distance with reduced losses and less costly infrastructure and the ability to easily derive low voltage and higher currents near the location where power is utilized with transformers. Power converters capable of converting AC power to DC power have also become very sophisticated in design for high efficiency, high power density and low cost.

In recent years, however, there has been increasing interest is generating power from so-called renewable resources such as solar and wind power which can often be provided in a geographically distributed manner and located more proximate to the location where power is utilized. However, such sources of energy from which power may be generated may be only intermittently available; thus requiring power storage. Power storage is also of increasing interest in order to balance loads on power distribution grids and distribute more power over presently available infrastructure. Substitution of electrical power for mobile devices, such as vehicles, to which power cannot be connected when in use also requires storage of power.

Storage of power can be achieved in many ways. However, at the present time, it is most practical to store power in the form of charge in batteries which implies storing and recovering power through use of direct current. It is therefore desirable for power converters to be designed to provide for bi-directional operation to transfer power both into and out of a storage device and to provide conversion between AC and DC power. Numerous designs of power converters providing such functions have been developed and improvements in capacity, power density, reliability, size, efficiency and reductions in cost are continually being sought.

At the present time, most sources of inefficiency in power converters is the power consumed during the turn-on and turn-off of switches at high frequency and limitations of design and operating parameters of available semiconductor switches of sufficient current-carrying capacity. For example, power converters capable of providing substantial power usually include insulated gate bipolar transistors (IGBT), integrated gate commutated transistors (IGCTs) and gate turn=off thyristors (GTOs) for high current carrying capability and tolerance for electrical stress (which generally must be provided by protective circuitry and/or converter design) but which exhibit high switching energy consumption and significant diode reverse recovery time which limits the frequency at which they can be operated; often to a frequency as low as nine times the fundamental frequency of the AC waveform input or output while operation at high frequencies is desirable to allow reduction in size of magnetic elements and/or capacitors used in AC input or output filters. The power consumed by switching not only decreases the efficiency of the power converter but must be dissipated as heat; requiring heat sink structures or other cooling arrangements that increase size and weight and reduce power density of power converters.

In general, it is desirable to provide for the switches in power converters to be controlled in such a manner that switching is performed when the voltage across the switches is zero or near-zero, referred to as zero voltage switching (ZVS) or zero voltage transition (ZVT). (The term "soft switching" may also be used but should be understood as a collective reference to numerous techniques, including ZVS and ZVT, of reducing electrical stress and energy consumption during switching.) However, for some power converter topologies, ZVS or soft switching can only be achieved at the cost of generating very complex switch control waveforms and/or using resonant circuits which increase the number of electrical elements in the power converter design and thus are a significant factor in size, weight and cost of a power converter as well as having the potential to increase electrical stress on elements of the power converter.

SUMMARY OF THE INVENTION

It is therefore an object of the present invention to provide a bi-directional power converter of improved efficiency which can provide high power level conversion between AC and DC power in which electrical stress on switches is limited, which requires fewer electrical elements and is operable at increased frequency and with ZVS without requiring complex switch driver control.

In order to accomplish these and other objects of the invention, a three-level active neutral point clamped zero voltage switching power converter is provided comprising a main circuit and an auxiliary circuit wherein the main circuit comprises a plurality of main switches connected in series and comprising at least an inner pair of switches and an outer pair of switches, each of the switches having a diode connected anti-parallel with a respective one of the switches wherein the inner pair of switches are connected at a first node, and a clamping circuit including additional main switches connected in parallel with the inner pair of switches, each of the additional main switches having a diode connected anti-parallel with a respective one of said additional main switches, wherein said two additional main switches are connected at said neutral point such that two paths are provided between said node and said neutral point under conditions of either positive or negative current conditions at said first node, the auxiliary circuit comprising a circuit for selecting between the two paths for each of the positive and negative current conditions.

BRIEF DESCRIPTION OF THE DRAWINGS

The foregoing and other objects, aspects and advantages will be better understood from the following detailed description of a preferred embodiment of the invention with reference to the drawings, in which:

FIGS. 4A and 4B are schematic diagrams of the main switch portion of FIG. 2 illustrating upper current paths for positive and negative current flow, respectively, FIG. 5 graphically illustrates operational switching waveforms for positive current in the circuit of FIG. 2.

FIGS. 6-1, 6-2, 6-3, 6-4, 6-5 and 6-6 are schematic diagrams illustrating the topological stages of the circuit of FIG. 2 for positive current resulting from the operational waveforms of FIG. 5, FIG. 7 graphically illustrates operational switching waveforms for negative current in the circuit of FIG. 2.

FIGS. 8-1, 8-2, 8-3, 8-4, 8-5 and 8-6 are schematic diagrams illustrating the topological stages of the circuit of FIG. 2 for negative current resulting from the operational waveforms of FIG. 7, FIG. 9 graphically depicts the simple derivation of control waveforms for operation of the invention.

DETAILED DESCRIPTION OF A PREFERRED EMBODIMENT OF THE INVENTION

Figure 1:
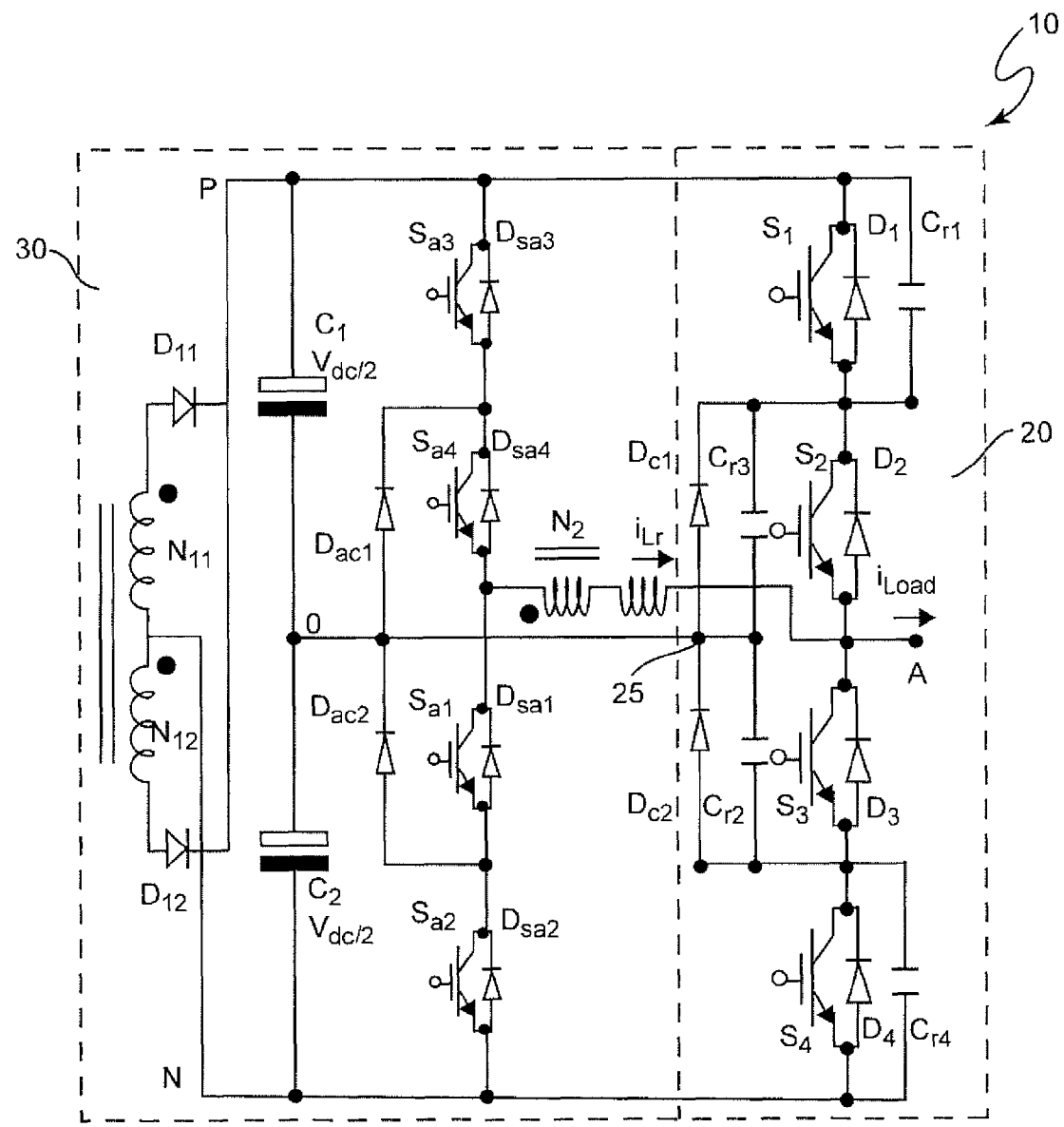
FIG. 1 is a schematic diagram of a known three-level diode neutral point clamped zero voltage transition bi-directional power converter.

Referring now to the drawings, and more particularly to FIG. 1, there is shown a schematic diagram of a known and exemplary three-level diode neutral clamped zero voltage switching power converter 10 over which the present invention provides numerous improvements and advantages. It should be understood that while the invention is not depicted in FIG. 1, no portion of the circuit illustrated is admitted to be prior art in regard to the present invention. FIG. 1 has therefore been labeled "Related Art".

Three-level diode neutral point clamped (DNPC) voltage source converter (VSC) topologies, of which the circuit 10 of FIG. 1 is an example, have recently become popular for medium voltage and high power applications. Recent studies have also shown that such topologies are attractive and competitive for low voltage, high current applications such as are presented by power requirements for logic circuits and processors of current and foreseeable designs. A converter such as that depicted in FIG. 1 can be used alone as a single phase converter or as a phase leg in a multi-phase arrangement connected in parallel with a plurality of other such converters.

The three-level DNPC VSC inherently features higher voltage and power handling capabilities, better AC output harmonics spectrum and better electro-magnetic interference (EMI) performance compared to two-level counterpart converters.

In essence, a three level diode neutral point clamped converter topology includes, as a main switching circuit 20, a series connection of four switches S1-S4. Switches S1 and S4 are referred to as an outer pair of switches which are operated to alternately conduct current and S2 and S3 are referred to as an inner pair of switches which are also operated to alternately conduct current. The relative frequency of the operation of the inner and outer switches depend on operation conditions such as power factor. For example, if the power factor is +1, the inner switches are operated at a low frequency (e.g., the fundamental frequency of the AC power) and the outer switches are operated at high frequency. However, if the power factor is −1, the inner switches will be operated at a high frequency and the outer switches will be operated at a low frequency. Therefore, there is necessarily an imbalance of losses between inner and outer pairs of switches in a DNPC VSC.

Switches S1-S4 each comprise a transistor which includes an anti-parallel diode, D1-D4, respectively, which can conduct when the transistors are turned off and the current is in a direction opposite to the direction of current in the transistors when turned on. Additional diodes Dc1 and Dc2 are provided to clamp the neutral point 25 of the circuit that provides the third voltage level of the three-level power converter. The clamping of the neutral point also provides the advantage of limiting the voltage stress on the switches to one-half the voltage across the series connection of switches (points P and N). The main circuit thus formed and controlled can perform either DC to AC conversion (left to right, as drawn) or AC ro DC conversion (right to left, as drawn). However, the main circuit 20, itself, performs hard switching and, as alluded to above, the IGBT, IGCT or GTO devices used as switches (and commercially available as half-bridge circuits) exhibit relatively high turn-on and turn-off energy requirements. Since the inner switches are operated at high frequency, the energy requirements of the outer switches S1 and S4 is negligible relative to the energy requirements of inner switches S2 and S3 during normal operation.

Among various known approaches to achieve soft-switching, zero voltage switching (ZVS) has been of special interest since it can achieve turning on of switches at zero voltage and eliminate the reverse recovery time of diodes. In addition, losses during turn-off of switches can be substantially reduced by use of snubber capacitors in parallel with each switch.

To achieve soft switching of the all switches in main converter circuit 20, circuit 10 further includes an auxiliary circuit 30 which is essentially a circuit similar to the main circuit 20 and operated in a similar but complementary manner (as indicated by the subscripts) and including a magnetic element comprising three windings, N11, N12 and N2 and exhibiting a leakage inductance indicated by a fourth coil connected in series with N2 which resonates with resonant capacitors Cr1-Cr4 that can be anti-parallel or included in the main circuit 20, depending on how much capacitance is needed. During the ZVT or ZVS switching process, before the turn-on of a main switch, the corresponding auxiliary switch is turned on and initiates a resonance between the inductor and resonant capacitors. After the resonance process, the voltage of the turning-on switches drops to zero, allowing the switch to turn on under zero voltage conditions. However, while power consumed by the inner switches can be decreased to a degree by using an auxiliary circuit as shown in FIG. 1, the reverse recovery time of the diodes does not provide optimal reduction of switching energy and limits switching frequency such that the potential output power of the converter is also less than optimal. Further, a major disadvantage of DNPC VSCs remains the required control complexity and the consequent complexity of the auxiliary circuit.

Active neutral point clamping has recently been proposed to achieve improved balance between switching losses of inner switches S2, S3 and outer switches S1, S4 and to increase output power of the converter. However, no practical converter circuit providing active neutral point clamping has been developed that has proven successful in achieving such improvements using ZVS although zero current switching (ZCT) can be achieved in the circuit of FIG. 1 by omitting diodes Dac1 and Dac2 and using anti-parallel switches to provide neutral point clamping. The ZCT technique has been adopted in an ANPC VSC.

Figure 2:
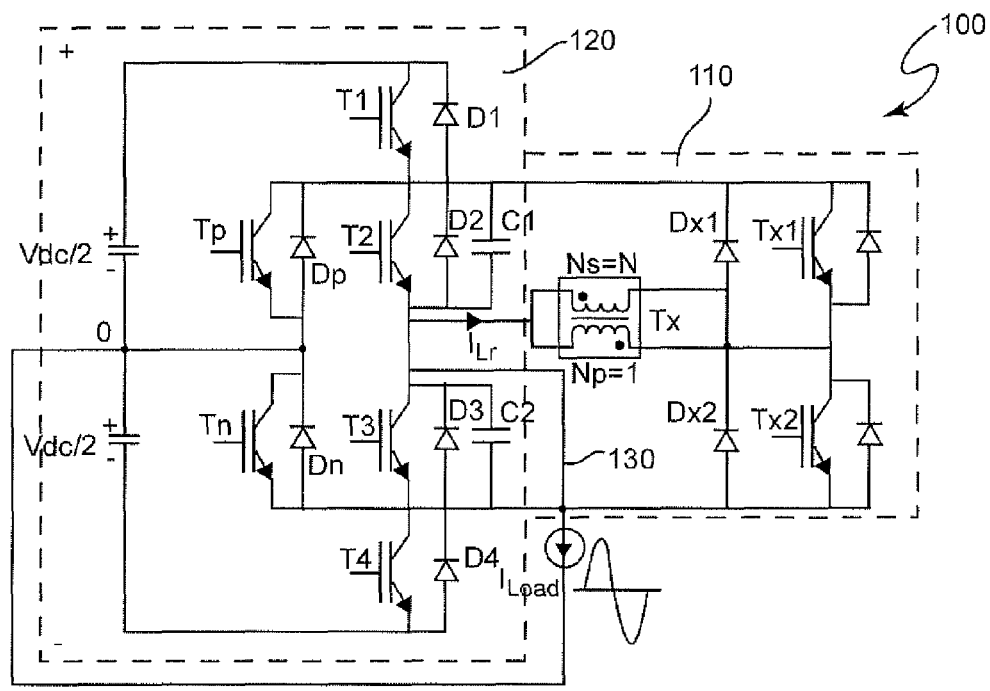
FIG. 2 is a schematic diagram of an exemplary Three-level active neutral point clamped zero voltage transition bi-directional power converter in accordance with the present invention.

Referring now to FIG. 2, a schematic diagram of a power converter circuit 100 in accordance with the invention is shown. As with the circuit of FIG. 1 the circuit illustrated in FIG. 2 can be used alone as a single phase converter or in parallel with other similar circuits in a multi-phase power converter arrangement as a phase leg thereof. As with the circuit of FIG. 1, circuit 100 also comprises an auxiliary circuit 110 and a main circuit 120. By comparison with FIG. 1, it is readily seen that a series connection of four switches T1-T4 and diodes D1-D4 identical to that of FIG. 1 is provided in main circuit 120. However, Snubber capacitors C1 and C2 are connected in parallel with each of the inner switches T2 and T3 and two additional main switches Tp and Tn with anti-parallel diodes Dp and Dn are provided in parallel with the inner switches T2 and T3 to actively clamp the neutral point.

The auxiliary circuit comprises a coupled magnetic element or transformer Tx in parallel with the output of the main circuit, another pair of switches and anti-parallel diodes Tx1, Tx2 in series with each other and in parallel with the pair of inner switches T2, T3 and a pair of additional diodes Dx1, Dx2 connected in series and in parallel with the pair of auxiliary switches Tx1, Tx2. A terminal of each of the primary and secondary windings are connected together to be opposingly magnetically coupled while the other terminal of the primary winding is connected to the common node of the series connection of Tx1 and Tx2 and the other terminal of the secondary winding is connected to the common node connecting the series connection of diodes Dx1 and Dx2. The three-level DC input or output is depicted by symbols +, 0 and − across a series connection of two capacitors. The AC input or output node and return path to the neutral point is depicted as a connection 130 and the AC current is depicted by $I_{load}$ and a sinusoidal waveform. Thus, it is seen that the three-level active neutral point clamped converter in accordance with the invention has fewer discrete components since the two clamping diodes, two auxiliary switches and two auxiliary diodes can be omitted and the coupled magnetic element is simplified by reduction to two windings. Control of the converter circuit in accordance with the invention is also much less complex than the control required for the converter circuit of FIG. 1 as will be discussed in greater detail below.

An important distinctive feature of the converter circuit in accordance with the invention and as illustrated in FIG. 2 is that there are two paths connecting node 130 with the neutral point regardless of the direction of the $I_{load}$ current. These paths are referred to hereinafter as upper and lower paths which are illustrated with darker lines in the schematic of the main circuit 120 of FIG. 2 in FIGS. 3A and 3B and 4A and 4B, respectively, for transitions between Vdc/2 and 0. The transitions between −Vdc/2 and 0 are complementary to those shown in FIGS. 3A-4B.

Figure 3A:
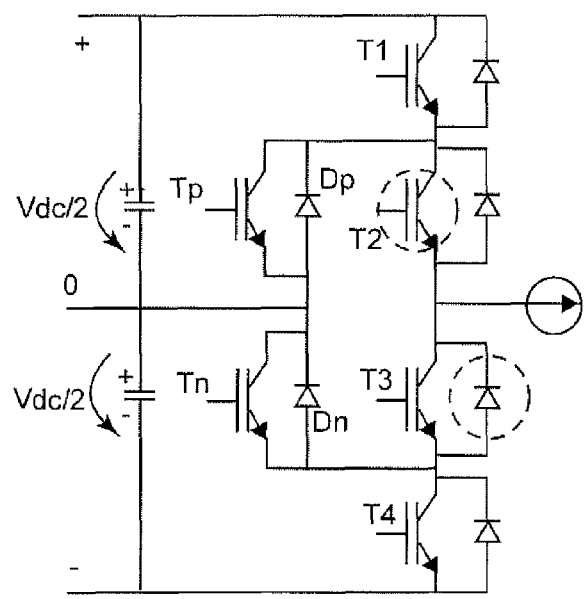
FIGS. 3A and 3B are schematic diagrams of the main switch portion of FIG. 2 illustrating lower current paths for positive and negative current flow, respectively.
Figure 3B:
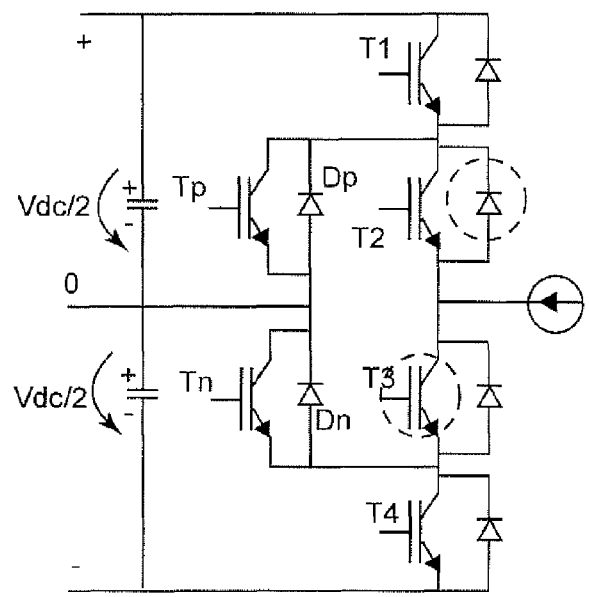

As shown in FIG. 3A, choosing the lower path involves commutations (e.g. the transfer of load current from one device to another, generally, in the case of the present invention, between a switch and a diode at either turn-on or turn-off of the switch; "commutations" being a collective reference to both turn-on and turn-off operations) between T2 and D3 when phase current is positive and flowing out of the bridge and, as shown in FIG. 3B, commutations between T3 and D2 when phase current is negative and flowing into the bridge. Note that, during those high frequency transitions, commutations only occur between the inner switches and their diodes, and T1 and Tn are kept on while Tp and T4 are kept off.

FIGS. 4A and 4B show the negative and positive current cases of choosing the upper path. Complementary to the lower paths shown in FIG. 3, it can be seen that the commutations are between clamping devices Tp (or Dp) and D1 (or T1). It should be noted that, during those transitions, commutations only occur between the outer devices and the clamping devices and T2 is kept on while T3 is kept off. Symmetrically for the level transition between −Vdc/2 and 0, only the outer devices and clamping devices Tn or Dn are involved in the commutations. Therefore, the different level transitions introduce two different pairs of switches and diodes and therefore require two sets of auxiliary circuits.

It is important to note that when the lower path is chosen for level transitions between Vdc/2 and 0, regardless of current direction, the commutations only occur between the inner devices T2 (or D2) and D3 (or T3). Symmetrically for the level transitions between −Vdc/2 and 0, the commutations can also occur between the inner devices by choosing proper path. With the above discussed path selection strategy of choosing lower paths such that commutations occur only between inner devices, the outer switches and the clamping switches only have one switching action in one AC line frequency cycle; the dominant switching losses are from the inner switches. The modulation method to implement such a strategy is very simple and can be realized by only one carrier waveform and one modulation waveform as shown in FIG. 9 as will be discussed below.

In the following description of the operation of the voltage source converter of FIG. 2, only the case of level transitions between $V_{dc}/2$ and 0 is analyzed to illustrate the operation principle. The case of level transitions between $-V_{dc}/2$ and 0 are symmetrical to the following description.

Figure 5:
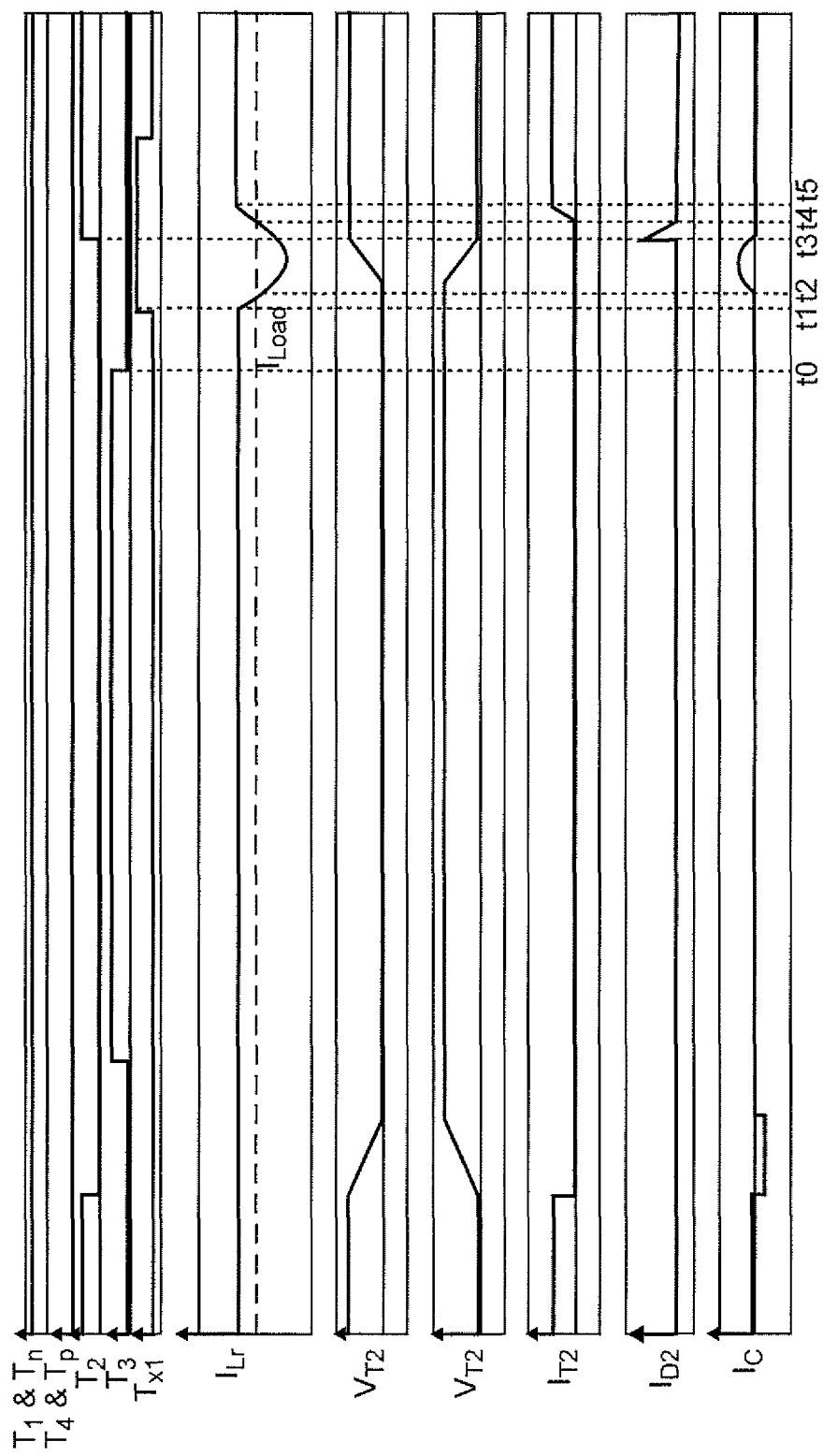

A.) $I_{Load}>0$ Positive Current Case:

When the load current is flowing out of the bridge, the commutating devices are T2 and D3. The corresponding control timing and operation waveforms of the VSC circuit of FIG. 2 are shown in FIG. 5. It can be seen that the auxiliary switch Tx1 controls ZVS turn-on of T2 from the six topological stages of ZVS process illustrated in FIGS. 6-1 to 6-6.

Figures 1, 6:
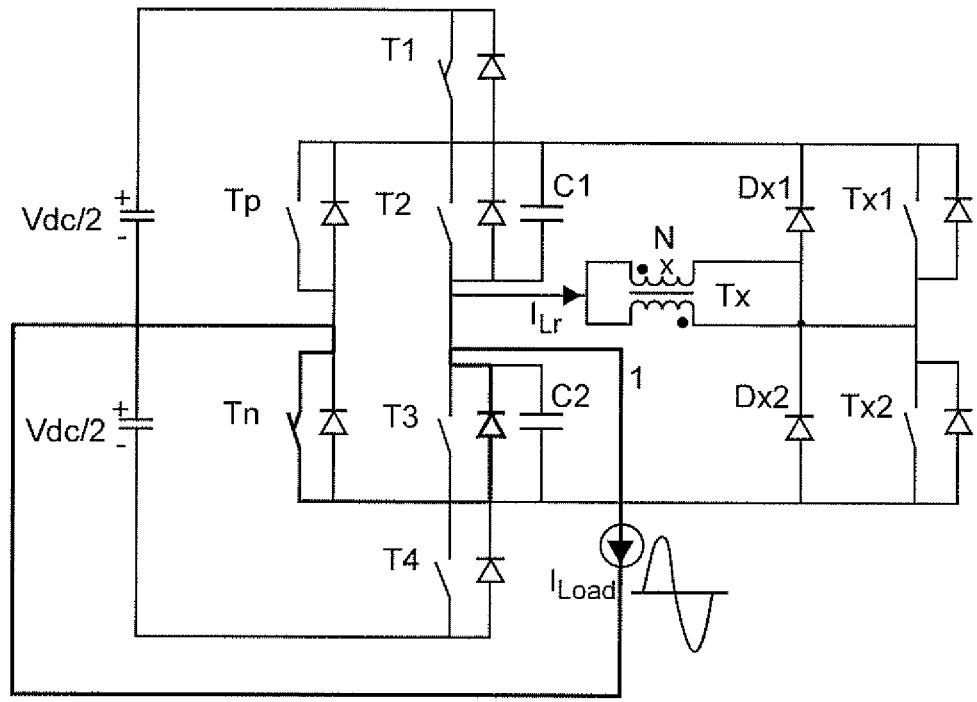
Figures 2, 6:
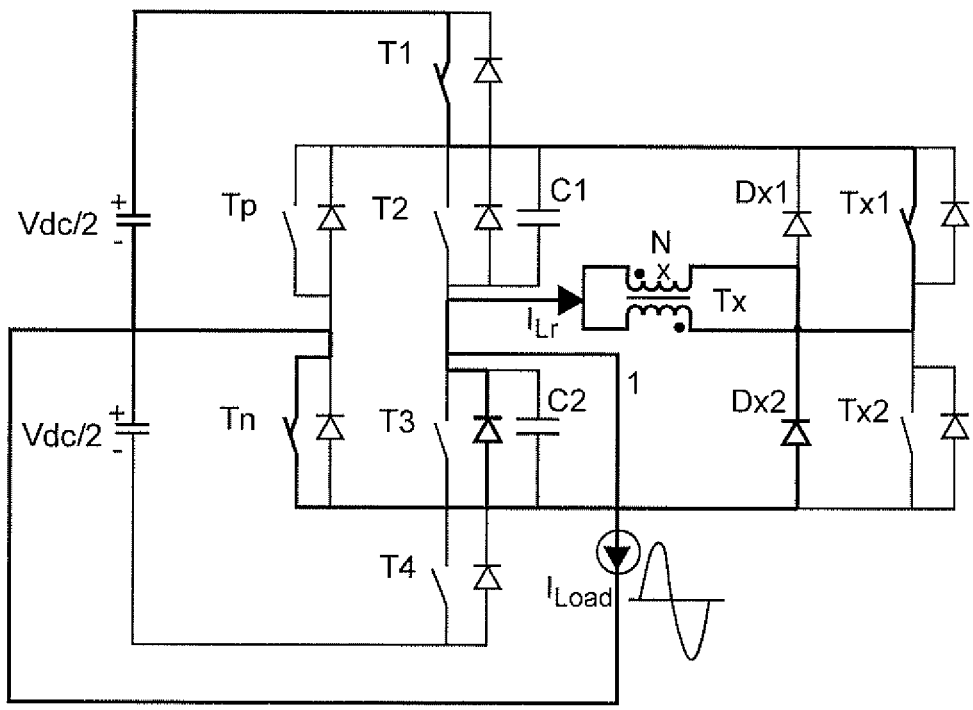

Stage One [t0~t1], FIG. 6-1:

In the initial stage, the phase leg outputs 0 voltage level, at t0 instant the gate drive signal for T3 is removed without switching losses while T2 is still in turn-off state, during this deadtime, the load current freewheels through Tn and D3.

Stage Two [t1~t2], FIG. 6-2:

At t1 instant, the auxiliary switch Tx1 is turned on. Then the primary side of the coupled magnetics Tx (the turn ratio is 1:N) bears the upper half DC voltage; while the secondary side starts to conduct current. The secondary side is shorted through Dx2 and D3. Therefore, the primary side voltage drops across the leakage inductance. As a result, the primary side current increases linearly as well as the secondary side current.

Figures 3, 6:
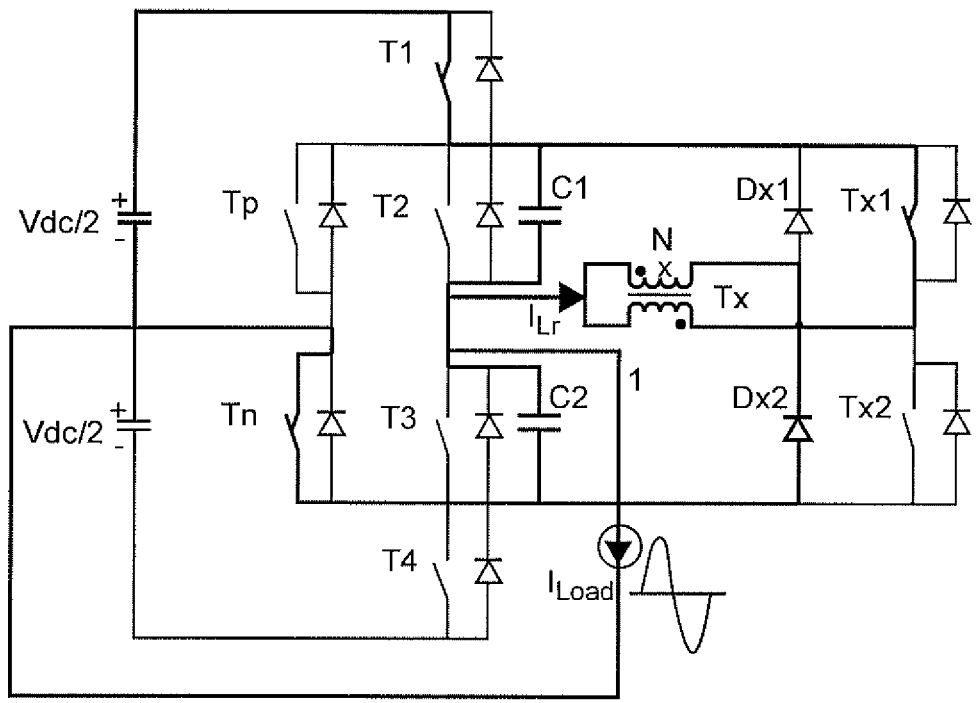

Stage Three [t2~t3], FIG. 6-3:

At t2 instant, the sum of the primary and secondary side current reaches the load current, so the current flowing through D3 drops to zero and turns off without reverse recovery process. Then leakage inductance starts to resonate with the snubber capacitors in parallel with T2 and T3. During this resonant process the snubber capacitor C1 is discharging and voltage across T2 is falling while the snubber capacitor C2 is charging and voltage across T3 is rising.

Figures 4, 6:
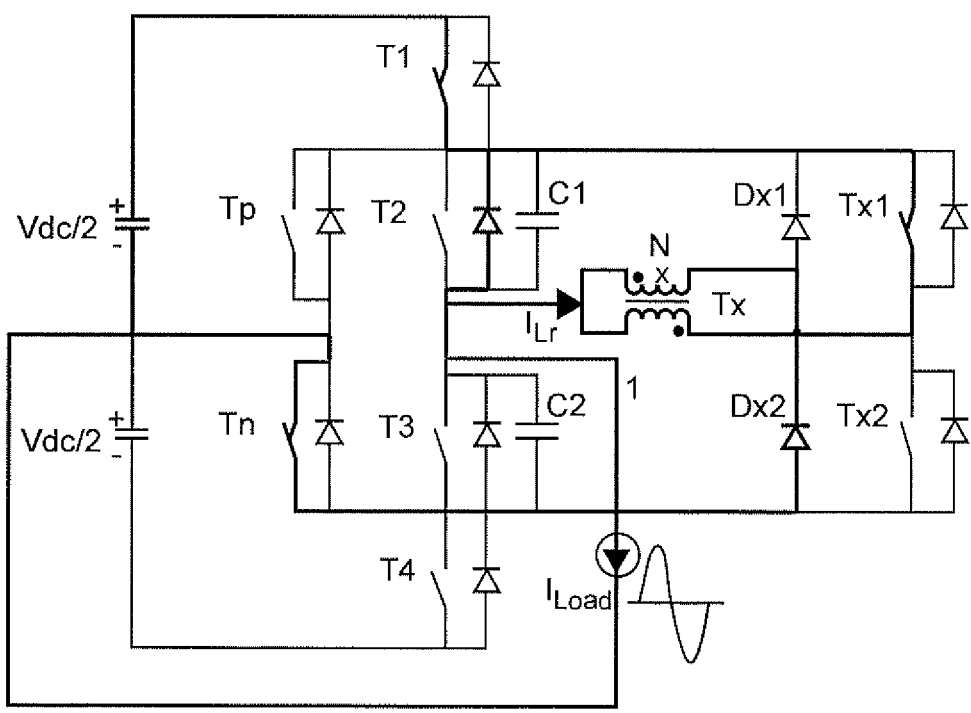
Figures 5, 6:
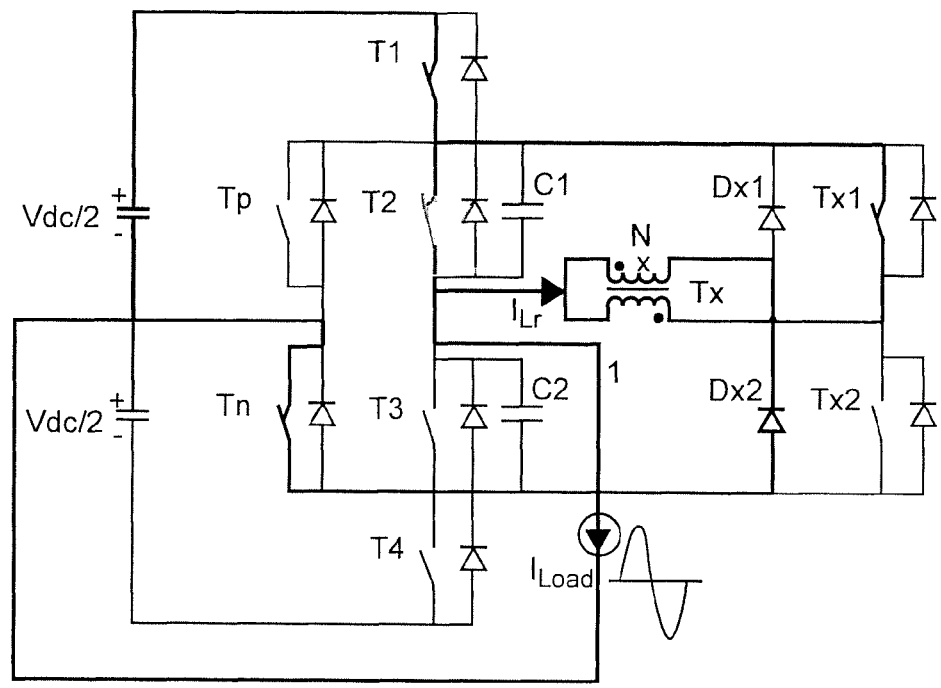
Figure 6:
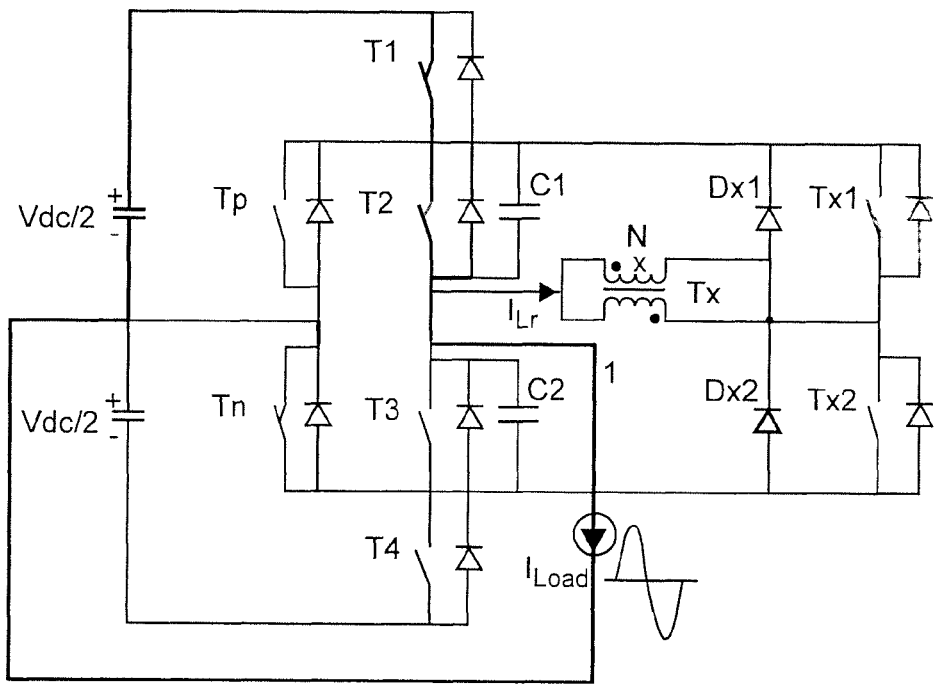
Figure 7:
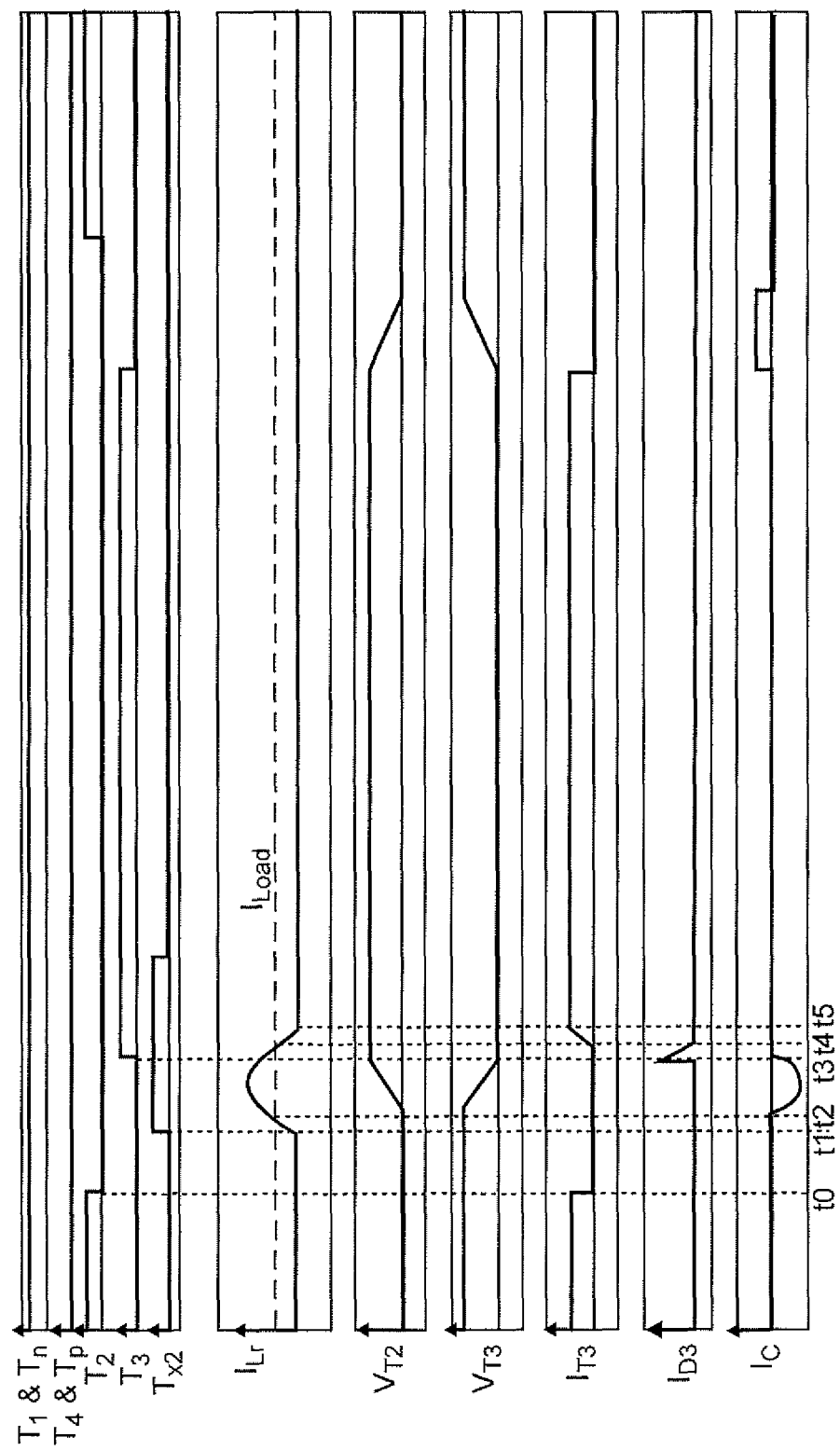

Stage Four [t3~t4], FIG. 6-4:

At t3 instant, the voltage across T2 drops to zero and T2 is turned on at zero-voltage condition. Between t3 and t4, the current of coupled magnetics is still greater than load current, so part of current freewheels via D2. Because of conduction of D2, the primary side is shorted via D2 and Tx1; while the secondary side bears the upper DC voltage and the voltage drops across the leakage inductance. As a result, the current of coupled magnetic decreases linearly.

Stage Five [t4~t5], FIG. 6-5:

At t4 instant, the current of coupled magnetics drops to load current, so current of D2 drops to zero and turns off without reverse recovery losses. After D2 turning off, T2 starts to carry current. During this time the current of coupled magnetics continue to decrease.

Stage Six [after t5], FIG. 6-6:

At t5 instant, the current of coupled magnetic drops to zero, so Dx2 turns off naturally. After t5 auxiliary switch Tx1 is turned off under zero-current and zero-voltage condition. The auxiliary circuit stops work and waits for the next high frequency switching cycle. (the auxiliary circuit is operated at high frequency but only for a very brief period of time in each high frequency switching cycle.) T2 continues to conduct and can be turned off with low switching loss (due to the snubber capacitor C1, as alluded to above) in accordance with simple and well understood pulse width modulation (PWM).

B.) $I_{Load}<0$, Negative Current Case:

When the load current is flowing into the bridge, the commutations are chosen to be between inner devices T3 and D2. The auxiliary switch Tx2 controls ZVS turning-on of T3. The ZVS process and waveforms are similar to the case of current flowing out of bridge and there are also six topological stages in one cycle, as illustrated in FIGS. 8-1 to 8-6.

Figures 1, 8:
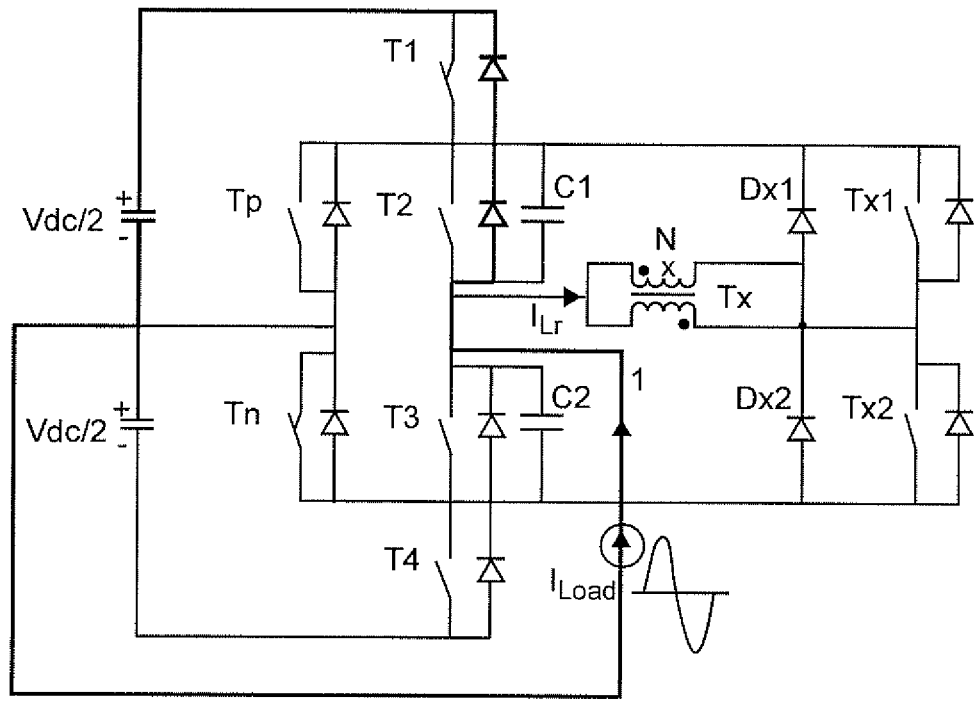
Figures 2, 8:
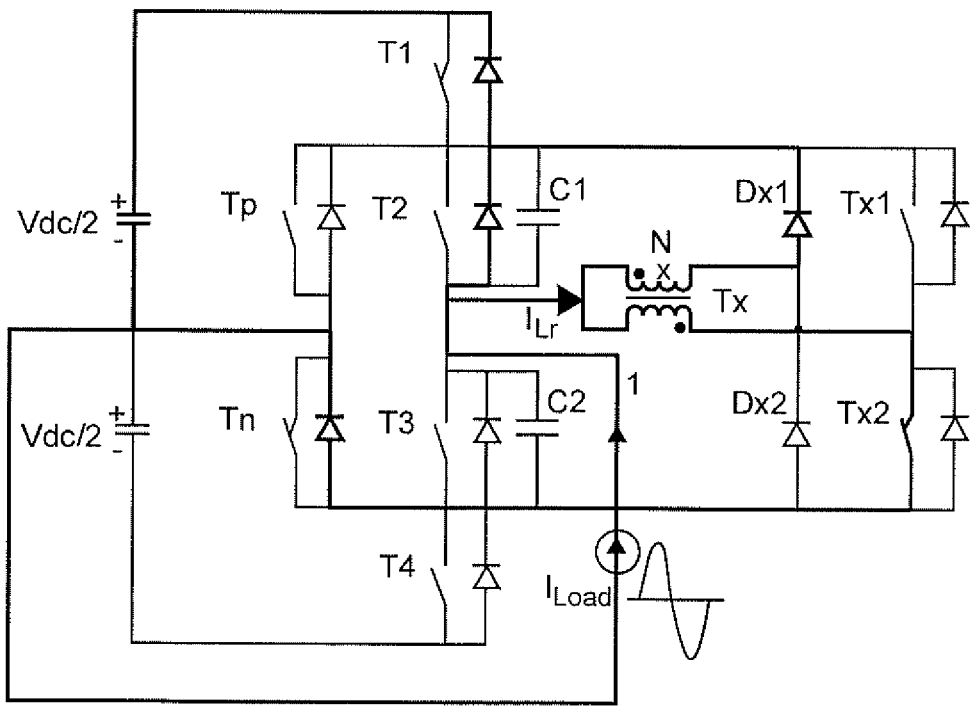
Figures 3, 8:
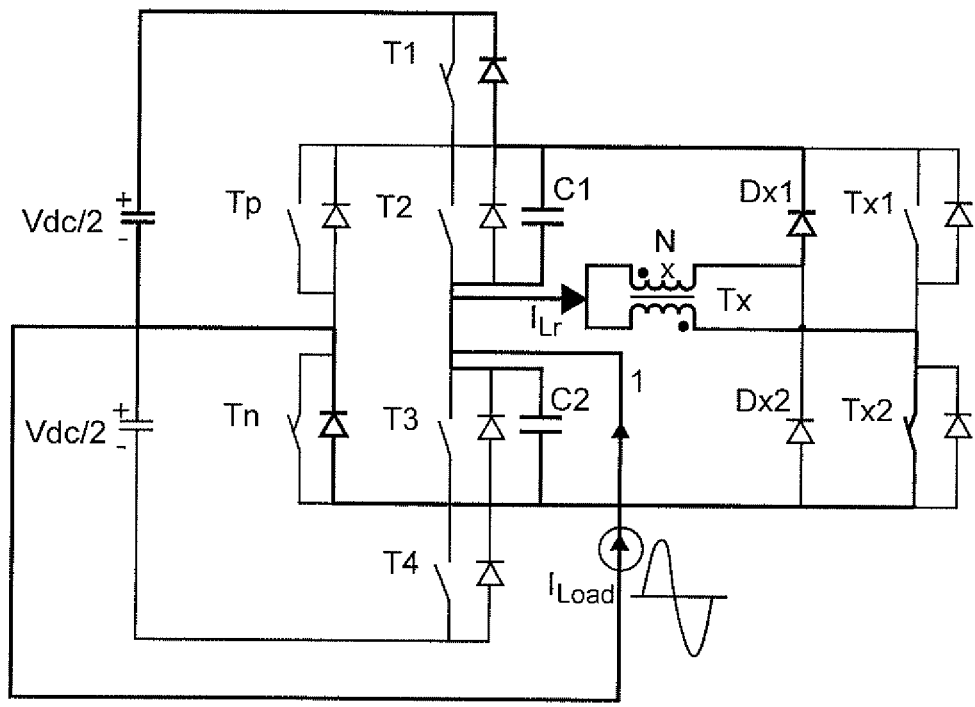
Figures 4, 8:
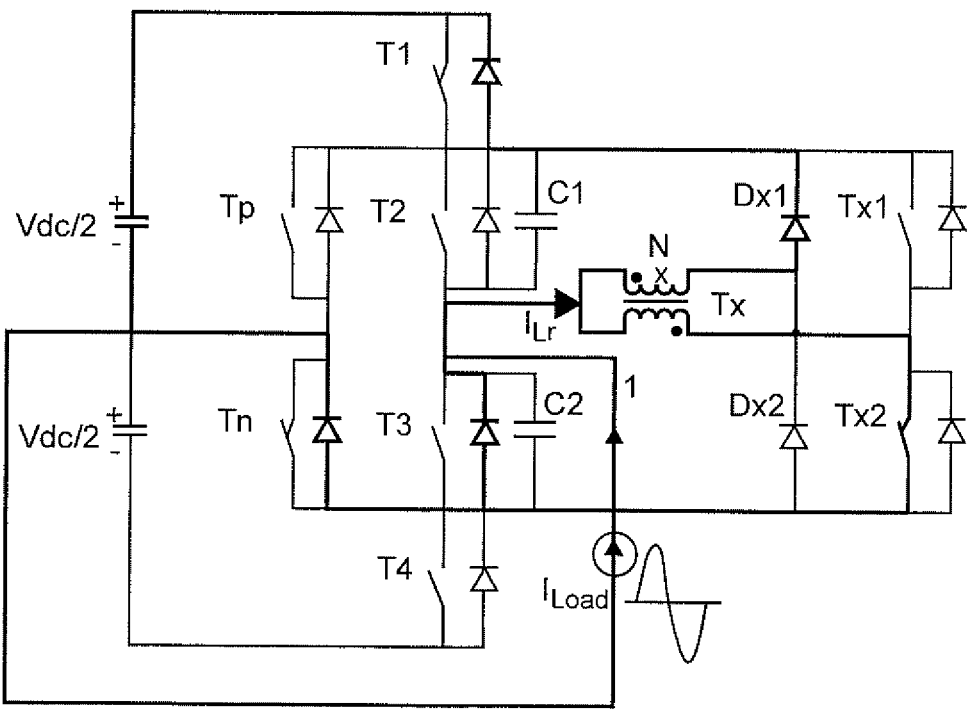
Figures 5, 8:
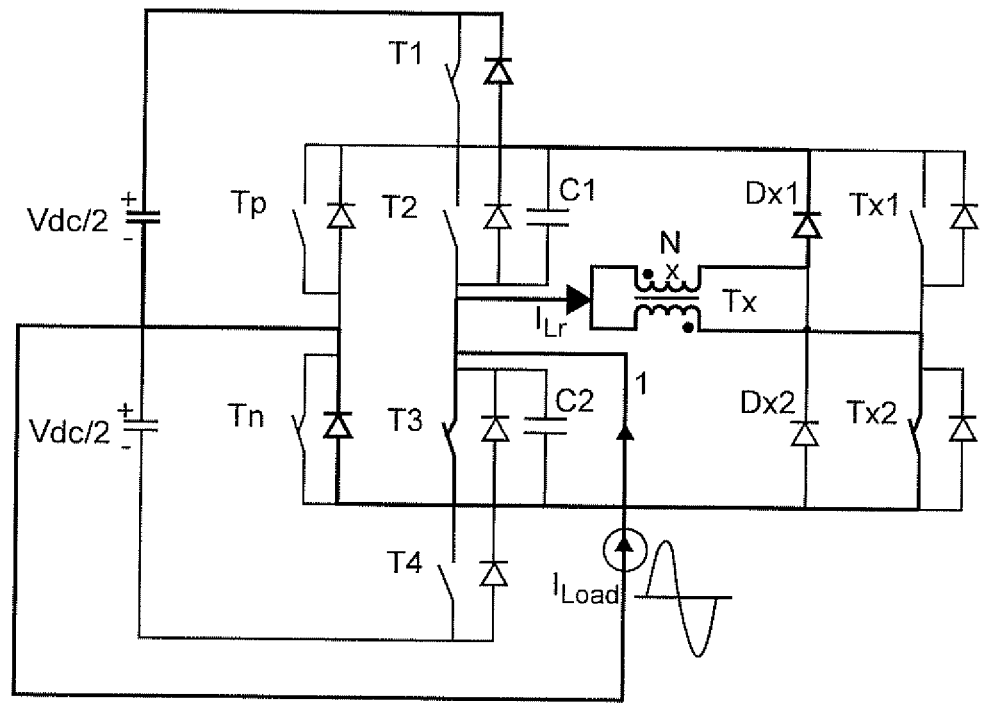
Figures 6, 8:
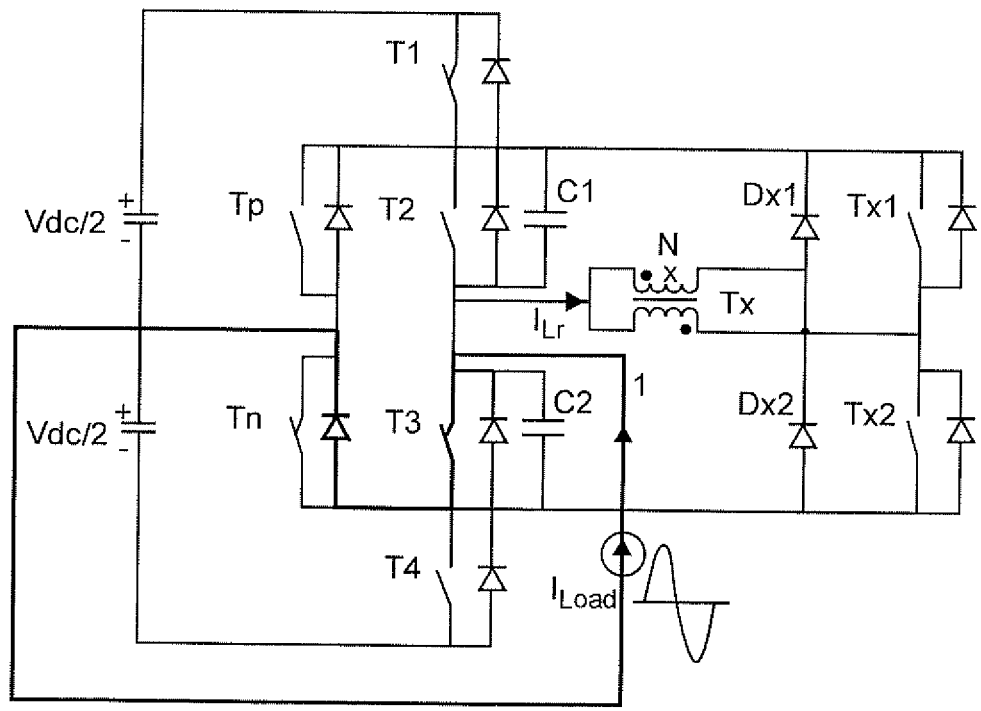

Stage One [t0~t1], FIG. 8-1:

At the initial stage the phase leg outputs $V_{dc}/2$ voltage level and the output current flows through D1 and D2. At t0 instant the gate drive signal for T2 is removed without switching losses while T3 still in a turned-off state, during this deadtime the load current freewheels through D1 and D2.

Stage Two [t1~t2], FIG. 8-2:

At t1 instant, the auxiliary switch Tx2 is turned on, then the primary side of the coupled magnetics Tx bears the upper half DC voltage; while the secondary side starts to conduct current and is shorted via Dx1 and D2. Therefore, the primary side voltage drops across the leakage inductance. As a result, the primary side current increases linearly as well as the secondary side current.

Stage Three [t2~t3], FIG. 8-3:

At t2 instant, the sum of the primary and secondary side current reaches the load current, so the current flowing through D2 drops to zero and turns off without reverse recovery process. Then leakage inductance starts to resonate with the snubber capacitors in parallel with T2 and T3, during this resonant process the snubber capacitor C2 is discharging and voltage across T3 is falling while the snubber capacitor C1 is charging and voltage across T2 is rising.

Stage Four [t3~t4], FIG. 8-4:

At t3 instant, the voltage across T3 drops to zero and T3 is turned on at zero-voltage condition. Between t3 and t4, the current of coupled magnetics is still greater than load current, so part of the current freewheels via D3. Because of conduction of D3, the primary side is shorted via D3 and Tx2; while the secondary side bears the upper DC voltage.

As a result, the current of coupled magnetics decreases linearly.

Stage Five [t4~t5], FIG. 8-5:

At t4 instant, the current of coupled magnetics drops to load current, so current of D3 drops to zero and turns off without reverse recovery losses. After D3 turns off, T3 (turned on at zero volts at stage 1) starts to carry current. At the same time the current of coupled magnetics continue to decrease.

Stage Six [after t5], FIG. 8-6:

At t5 instant, the current of coupled magnetics drops to zero, so Dx1 turns off naturally. Then, after t5, auxiliary switch Tx2 can be turned off under zero-current and zero-voltage condition. The auxiliary circuit stops work and waits for the next nigh frequency switching cycle. T3 continues to conduct and can be turned off with low switching loss (due to the snubber capacitor C1, as alluded to above) in accordance with simple and well understood pulse width modulation (PWM).

The above analysis elaborates the ZVS turning-on process for both load current direction cases And demonstrates that inner switches T2 and t3 can be turned on without switching losses while turn-on losses of T1, T4, Tp and Tn are very small and substantially zero since they are turned on only at the low fundamental frequency of the AC voltage and at substantially zero voltage and zero current. Of similarly high importance, the above analysis demonstrates that the diodes are turned off at zero current so that reverse recovery time is avoided and the operating frequency of the VSC of FIG. 2 is not limited thereby allowing higher frequencies to be used to allow use of smaller magnetic elements (which may also be of simplified design). The turning-off losses of switches are also reduced, by the snubber capacitors in parallel with T2 and T3. The voltage changing rate on T2 and T3 is slowed and dependent on the capacitance and load current at the turning-off process. Further, the current changing rate of T2 and T3 is relatively much higher, and the current drops to zero very quickly. Therefore, the overlap of non-zero voltage and current is reduced and, consequently, the turning-off losses are reduced to a very low level.

As alluded to above, the VSC circuit of FIG. 2 can be operated to provide DC to AC (or vice-versa) conversion very simply using only two waveforms as illustrated in FIG. 9: a low frequency modulation (e.g. sinusoidal) waveform and a high frequency carrier waveform. Pulse width modulation can be derived by a simple comparison or logical combination of the two waveforms while the switching waveform for Tx1 and Tx2 can be derived with suitable timing by comparison of the magnitude of the carrier waveform with suitable thresholds and selecting between Tx1 and Tx2 for switching based on zero-crossings of the modulation waveform. Many other techniques for developing suitable drive waveforms for the VSC circuit of FIG. 2 will be evident to those skilled in the art. Operational sets of waveforms for power factors of +1 and −1 are shown in Figure in the upper and lower sets of waveforms, respectively.

Figure 10:
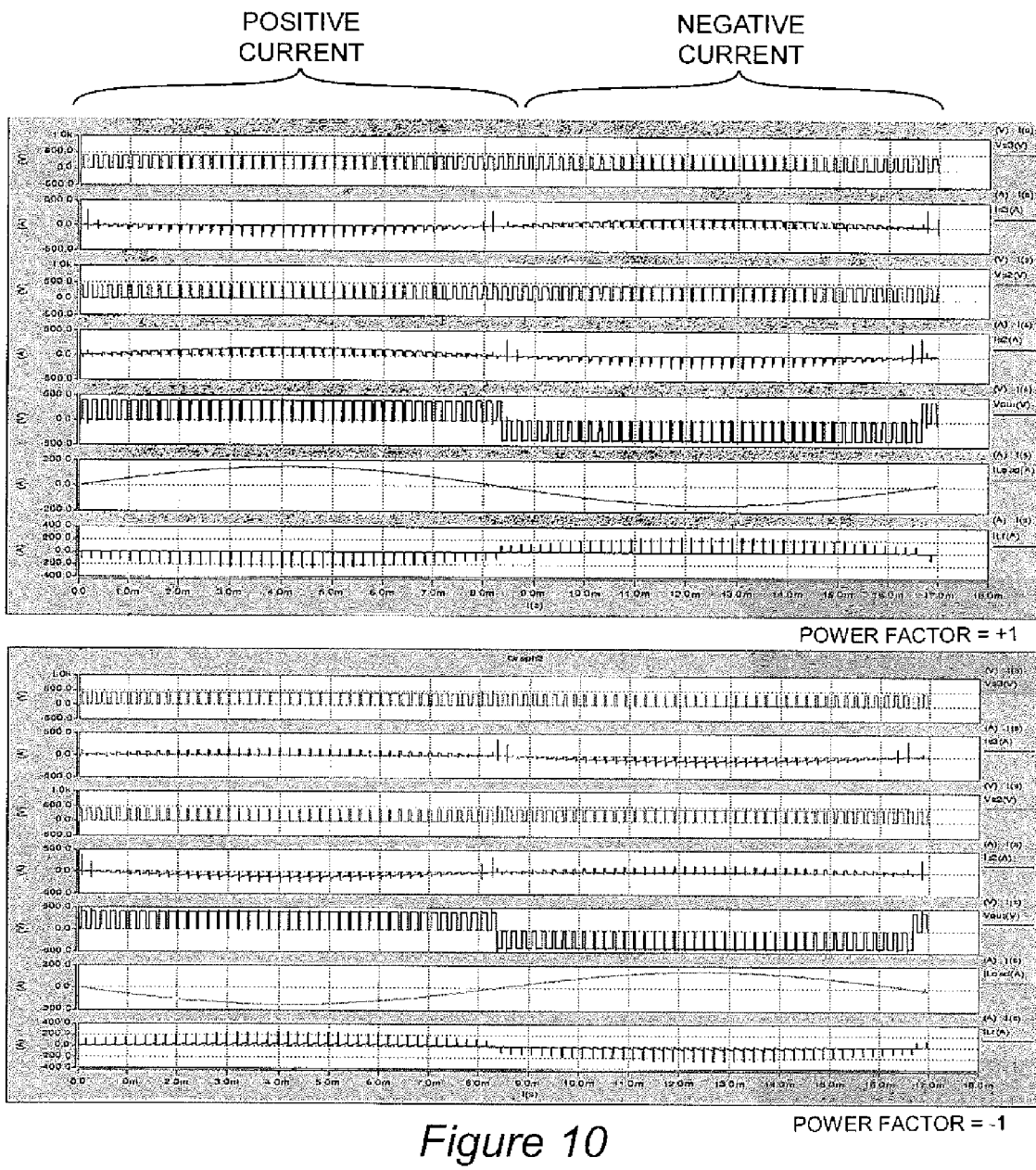
FIG. 10 depicts experimental waveforms for power factors of 1 and −1.

It should be appreciated from FIGS. 9 and 10 that change of relative operation frequency of the inner and outer switches with operating conditions such as power factor which is required in diode neutral point clamped VSCs is avoided by the active neutral point clamped VSC in accordance with the invention which allows the outer switches, T1 and T4, to be operated at low frequency and the inner switches, T2 and T3, to be operated at high frequency, regardless of power factor, using the simple modulation strategy of FIG. 9. The losses would still be unbalanced and concentrated in the inner switches without the auxiliary circuit but the simple auxiliary circuit in accordance with the invention can eliminate the inner switch losses by providing ZVS operation. Therefore, the auxiliary circuit can be very simple since only control of the inner switches to provide ZVS need be provided to eliminate virtually all switching losses.

Figure 11:
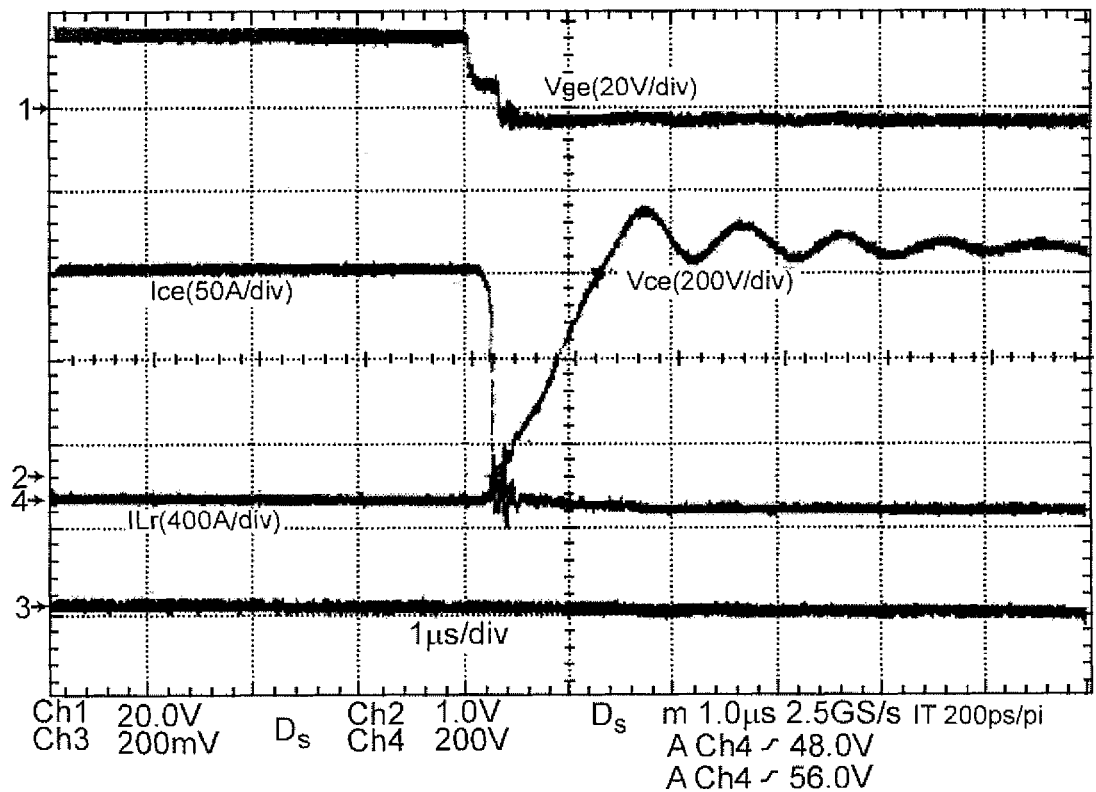
FIG. 11 depicts experimental results of switching voltage and current waveforms for turn-off of main switching transistors of FIG. 2, FIG. 12 graphically depicts a comparison of hard switching and soft switching energy during turn-off of the main switches of the circuit of FIG. 2.
Figure 12:
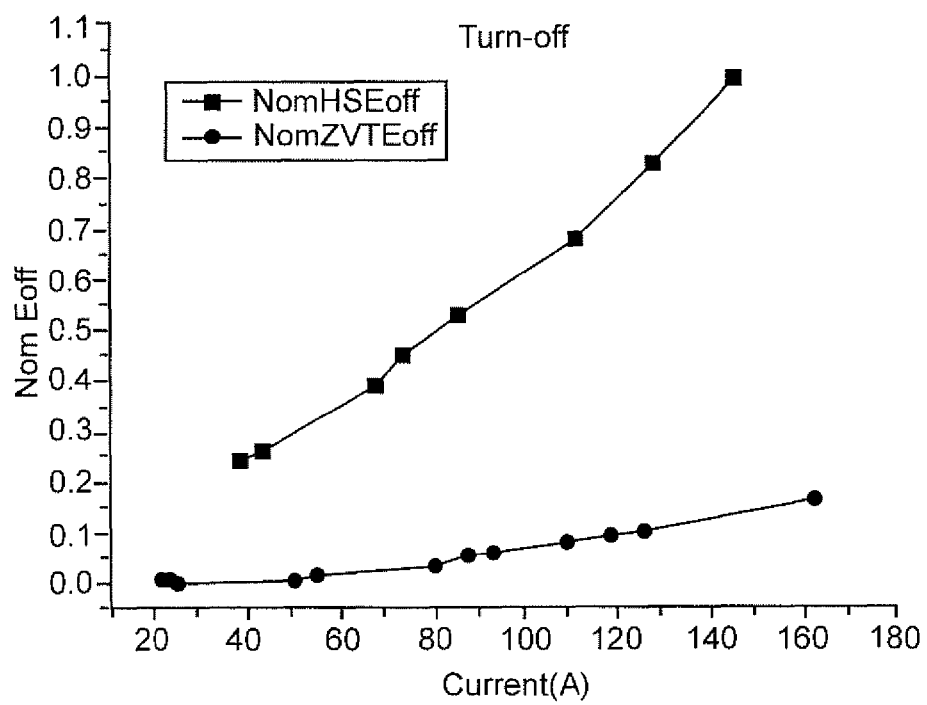
Figure 13:
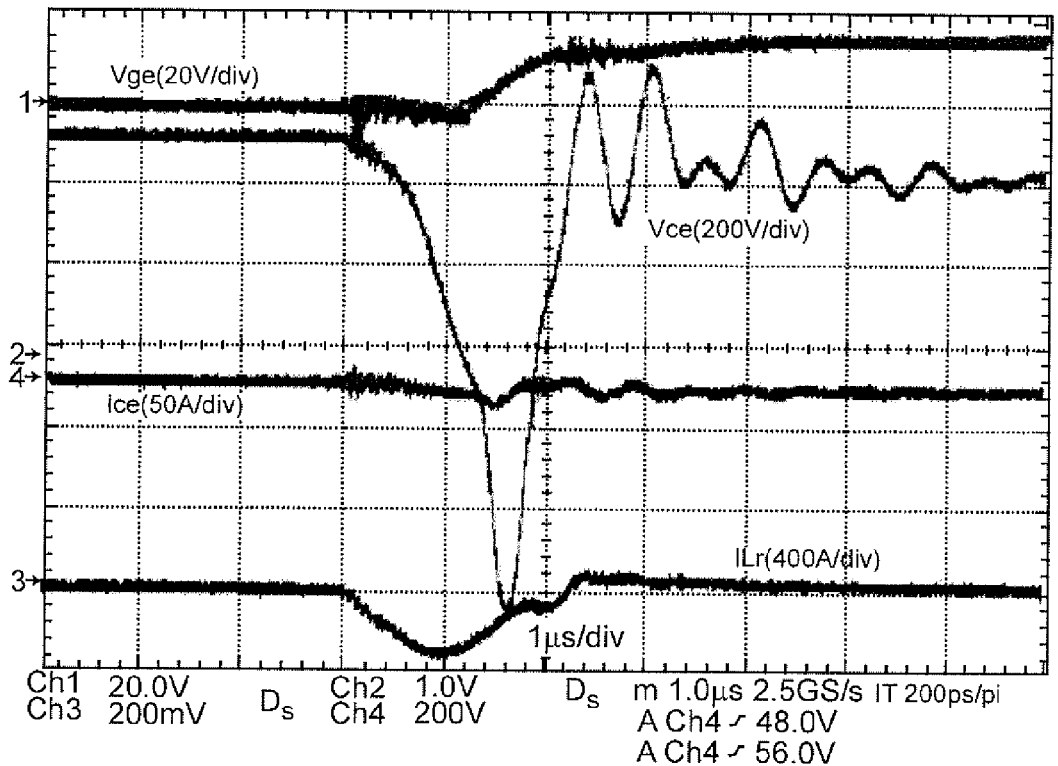
FIG. 13 depicts experimental results of switching voltage and current waveforms for turn-on of main switching transistors of FIG. 2, and FIG. 14 graphically depicts a comparison of hard switching and soft switching energy during turn-on of the main switches of the circuit of FIG. 2.
Figure 14:
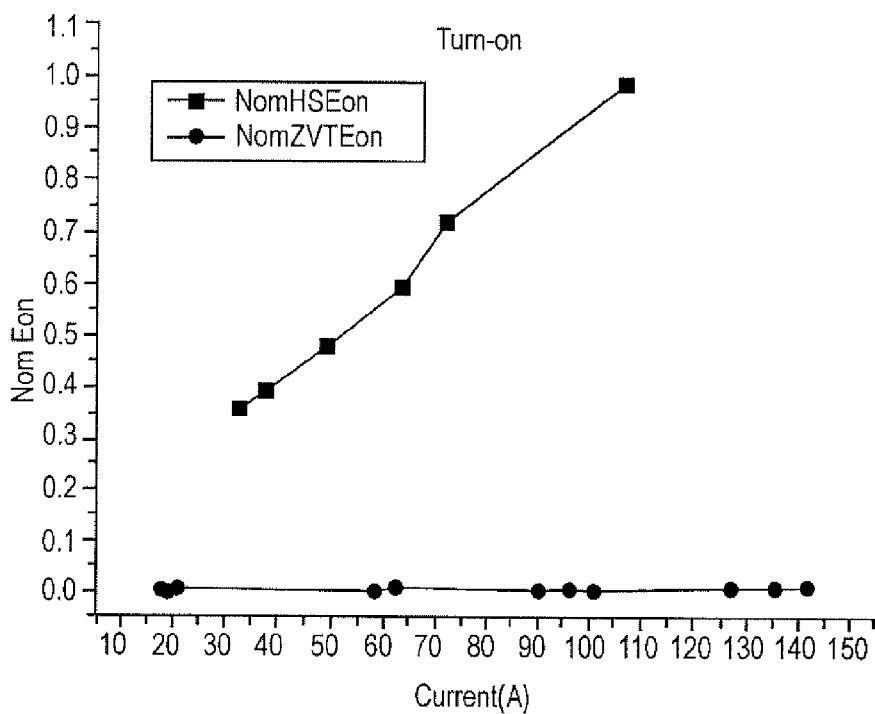

Waveforms observed (at T3 as an example) during experimental verification of operability and performance of the VSC circuit of FIG. 2 are illustrated in FIGS. 11 and 13. During this experimental verification, the circuit was operated at a frequency of 5 KHz which is much higher than the frequency possible under limitations imposed by reverse recovery time of diodes. A comparison of switching energy of exemplary switch T3 with and without the ZVS as provided in accordance with the invention is illustrated as a function of $I_{load}$ in FIGS. 12 and 14. It can be seen that the experimentally derived waveforms of FIGS. 11 and 13 compare very favorably with those discussed above in the operational analysis of the negative current operation of the invention (FIG. 8). It can also be seen from FIGS. 12 and 14 that the ZVS provided in accordance with the invention reduces the switching losses to a very small fraction of a hard switching three-level neutral point clamped VSC circuit.

In view of the foregoing, it is clearly seen that the invention provides a three-level neutral point clamped VSC circuit which requires only a reduced number of electrical elements with simplified coupled magnetic elements that can be operated at much increased frequency so that power density can be increased and the full potential power delivery can be achieved. The circuit can also be operated based on only two control waveforms from which the required switching waveforms for PWM can be derived in numerous, comparatively simple ways with simple circuits. No output sensing or feedback is required. The efficiency of conversion between AC and DC power (and vice-versa) is also of improved efficiency with the ZVS provided in a novel manner in accordance with the invention; allowing reduced heat dissipation requirements to further increase power density of the converter.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A three-level active neutral point clamped zero voltage switching power converter comprising a main circuit and an auxiliary circuit,
   said main circuit comprising
   a plurality of main switches connected in series, said plurality of switches comprising at least an inner pair of switches and an outer pair of switches, each of said switches having a diode connected anti-parallel with a respective one of said switches wherein said inner pair of switches are connected at a first node, and a clamping circuit including first and second additional main switches connected in parallel with said inner pair of switches, each of said first and second additional main switches having a diode connected anti-parallel with a respective one of said first and second additional main switches, wherein said first and second additional main switches are connected at a neutral point such that two paths are provided between said first node and said neutral point under conditions of either positive or negative current conditions at said first node,
   said auxiliary circuit comprising
   a circuit including a resonant element for selecting between said two paths for each of said positive and negative current conditions,
   a pair of auxiliary switches connected in series and in parallel with said inner pair of switches, each of said auxiliary switches having a diode connected in parallel with a respective one of said auxiliary switches, said pair of auxiliary switches being connected at a second node,
   a pair of diodes connected in series, wherein diodes of said pair of diodes are connected at a third node, and
   a magnetic element comprising first and second windings magnetically coupled in opposition wherein first terminals of said first and second windings are connected together and to said first node and a second terminal of said first winding is connected to said second node and said second terminal of said second winding is connected to said third node.

2. The power converter as recited in claim 1 wherein said clamping circuit comprises first and second additional main switches, said first and second additional main switches being operated alternately and in synchronism with second and first switches of said outer pair of main switches.

3. The power converter as recited in claim 1, wherein said outer pair of switches is operated at a desired fundamental frequency of alternating current at said first node and said inner pair of switches is operated at a frequency in excess of nine time said fundamental frequency.

4. The power converter as recited in claim 1, wherein said main switches are insulated gate bipolar transistors.

5. The power converter as recited in claim 1, wherein said first and second additional main switches are insulated gate bipolar transistors.

6. The power converter as recited in claim 1, wherein said circuit for selecting between said paths comprises insulated gate bipolar transistors.

7. The power converter as recited in claim 1, wherein DC power is applied across said series connected main switches and AC power is output at said first node.

8. The power converter as recited in claim 1, wherein AC power is applied at said first node and DC power is output across said series connected main switches.

9. The power converter as recited in claim 1, wherein said plurality of series connected main switches comprise only four series connected main switches.

10. The power converter as recited in claim 1, wherein said inner pair of switches are operated with pulse width modulation.

* * * * *